United States Patent [19]

Dableh

[11] Patent Number: 4,613,477
[45] Date of Patent: Sep. 23, 1986

[54] METHOD OF REPOSITIONING ANNULAR SPACERS IN CALANDRIA STRUCTURES AND APPARATUS THEREFOR

[76] Inventor: Joseph H. Dableh, 806 Queensbridge Dr., Mississauga, Ontario, Canada, L5C 3K4

[21] Appl. No.: 591,907

[22] Filed: Mar. 22, 1984

[30] Foreign Application Priority Data

Dec. 12, 1983 [CA] Canada .................................. 443096

[51] Int. Cl.⁴ ....................... G21C 17/00; G21C 19/00
[52] U.S. Cl. .................................... 376/258; 376/260; 376/366; 310/166
[58] Field of Search .................. 310/27, 166; 376/258, 376/260, 292, 366

[56] References Cited

U.S. PATENT DOCUMENTS

3,718,829  2/1973  Wilson .................................. 310/27
3,735,162  5/1973  Alth ..................................... 310/27

*Primary Examiner*—Salvatore Cangialosi
*Attorney, Agent, or Firm*—Ridout & Maybee

[57] ABSTRACT

The invention provides an electromagnetic technique for repositioning garter springs, located between the coolant tubes and calandria tubes of fluid cooled nuclear reactors in which the garter springs are not directly accessible by mechanical means. An electromagnetic coil is advanced along the selected fuel channel to a position adjacent the garter spring, and a current pulse is passed through the coil thereby to exert an electromagnetic repulsive force on the garter spring having a component in the direction of the required displacement.

14 Claims, 13 Drawing Figures

FIG.13

METHOD OF REPOSITIONING ANNULAR SPACERS IN CALANDRIA STRUCTURES AND APPARATUS THEREFOR

FIELD OF THE INVENTION

This invention relates generally to a method of repositioning metallic members which are constrained to move longitudinally with respect to a tube with which they are associated, the members being located on one side of the tube wall at which they are not directly accessible by mechanical repositioning means.

BACKGROUND OF THE INVENTION

The invention is especially applicable to the repositioning of spacers in fluid-cooled nuclear reactors. In a fluid-cooled nuclear reactor, such as a Candu reactor, having a calandria comprising an array of calandria tubes each housing a coolant tube extending coaxially therethrough, the coolant tubes are generally spaced from the respective calandria tubes in which they are housed by annular spacers, such as "garter springs". The spacers are necessary to maintain the coaxial relationship of the tubes, and above all to prevent them from coming into contact as local overheating would cause structural damage.

In the installation of such a reactor, or even during its operation, spacers may be displaced from their required positions with the result that the coolant tubes will lack the necessary configuration of supports to carry the distributed load in operation of the reactor, and serious problems may arise from sagging of these tubes. For safe operation of such a reactor it is therefore necessary to have some way of repositioning the spacers after installation or even after the reactor has been operating for some time. However, these spacers are seated between the coolant tubes and the calandria tubes and are not directly accessible by mechanical means and so repositioning of the spacers has hitherto necessitated extensive dismantling of the calandria.

The present invention provides an alternative method for repositioning the spacers which does not require direct mechanical access to them and which in consequence is simpler and much less costly than hitherto known methods.

SUMMARY OF THE INVENTION

The invention is based on the concept of accessing the spacers electromagnetically by means of an electromagnetic coil which is advanced interiorly along the respective coolant tube to a position at which, when the current pulse is passed through the coil, an electromagnetic repulsive force will be exerted on the spacer. The annular spacers, and also the calandria tubes and coolant tubes, of a calandria type reactor are most commonly of a nonferromagnetic metal, typically a zirconium/niobium alloy.

Accordingly the invention provides, in a fluid-cooled nuclear reactor having a calandria comprising an array of longitudinally extending calandria tubes each housing a coolant tube extending coaxially therethrough, each coolant tube being spaced from its associated calandria tube by annular spacers seated therebetween, a method of repositioning a selected one of said spacers in situ by displacing it longitudinally from an initial position to a required position, which method comprises advancing an electromagnetic coil interiorly along the coolant tube to a position adjacent the spacer and passing a current pulse through the coil, the position of the coil relative to the spacer and the magnitude and rate of change of current being such as to exert an electromagnetic repulsive force on the spacer in the direction of the required displacement and sufficient to overcome static friction at the seating of the spacer between the tubes. It is usually preferable for the coil to be oriented coaxially with the coolant tube in order to maximize the repulsive force which is exerted. However, in certain cases the coil may be arranged with its axis parallel to but displaced from the tube axis.

In order to increase the range of movement of the spacer an accelerating impulse may be imparted to the spacer during its displacement by means of a second current pulse passed through a suitably positioned second coil in timed relation to the first-mentioned current pulse.

The method can be improved, so as to increase the life of the coil, by introducing a diverter switch into the circuit so as to divert current from the coil into a different path after a certain time, e.g. after the first period or two of the applied current pulse.

In practice, and especially in cases where the spacer must be displaced by a large amount, it may be necessary to move the spacer step by step from its initial position to the required position by a succession of such displacements.

BRIEF DESCRIPTION OF THE DRAWINGS

In order that the invention may be readily understood one method in accordance with the invention will now be described, by way of example, with reference to the accompanying drawings, in which.

DESCRIPTION OF THE PREFERRED EMBODIMENTS

Figure 1:
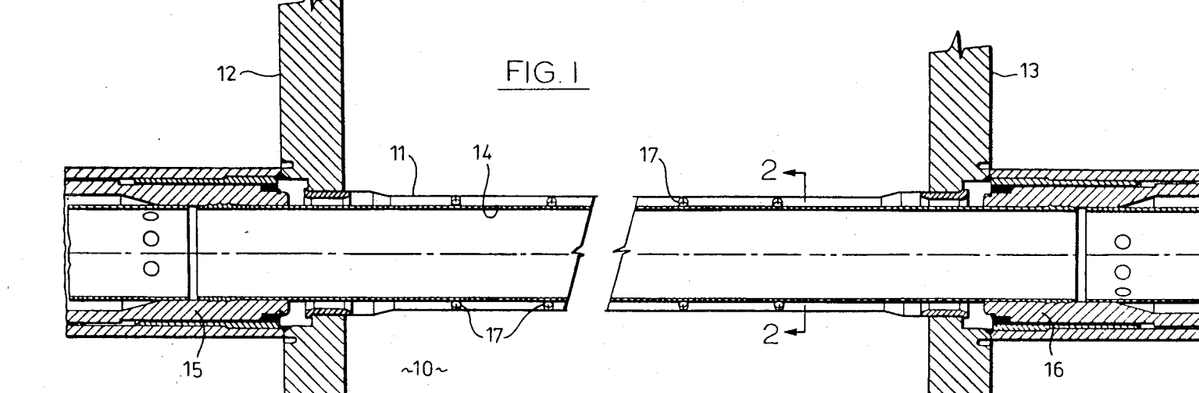
FIG. 1 illustrates part of the calandria of a heavy water-cooled, heavy water-moderated nuclear reactor, the figure showing one of the calandria tubes in longitudinal section.

Referring to FIG. 1, the calandria 10 of a Candu reactor comprises an array of parallel, longitudinally extending calandria tubes 11, only one of which is shown in FIG. 1, extending between end walls 12, 13 of the calandria housing. Pressurized carbon dioxide serving as a coolant is circulated through the housing, filling the space between the calandria tubes 11. Heavy water, serving both as a coolant and as a moderator is circulated through coolant tubes 14, commonly referred to as "pressure tubes", each coolant tube 14 extending coaxially through a respective calandria tube 11. The coolant tubes 14 are connected at their ends to end fittings 15, 16. The coolant tubes 14, in which fuel elements (not shown) are located, are supported in coaxial relationship with the calandria tubes 11 by means of annular spacers 17 distributed along their length. Such support is necessary since the tubes are typically about 20 feet long and would sag under the weight of the fuel elements if not supported intermediately between their ends. Moreover, the spacers must be positioned so as to provide adequate support for the distributed load along the entire length of a tube, since sagging or buckling of a coolant tube could result in contact between it and the calandria tube with serious consequences.

As previously mentioned, the annular spacers as well as the calandria tubes and coolant tubes are of nonferromagnetic metal, typically a zirconium/ niobium alloy.

In the installation of the reactor, particularly in the installation of the coolant tubes 14 and in the subsequent heat treatment of the calandria as a whole, the annular spacers 17 may be displaced from their original positions, and if the displacement is substantial they will not provide adequate support for the distributed load after the fuel elements have been located in the coolant tubes. Clearly, since the spacers are not directly accessible they cannot be relocated by mechanical means without extensive dismantling of the calandria structure.

Figure 2:
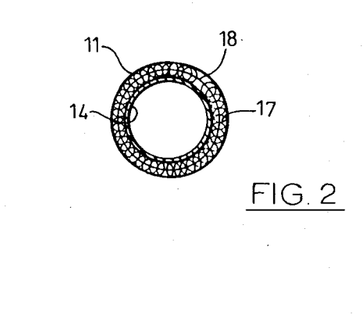
FIG. 2 is a section on line 2—2 in FIG. 1, showing one of the annular spacers.

In order to minimize heat transfer between the coolant tubes 14 and the calandria tubes 11 at the points of support, the spacers 17 are most commonly of the form shown in FIG. 2. A spacer of this type, commonly referred to as a "garter spring", consists of an open-ended coil of wire coiled into a toroidal shape and retained in that shape by a retaining hoop 18. The hoop 18 is of the same kind of wire.

Figure 3:
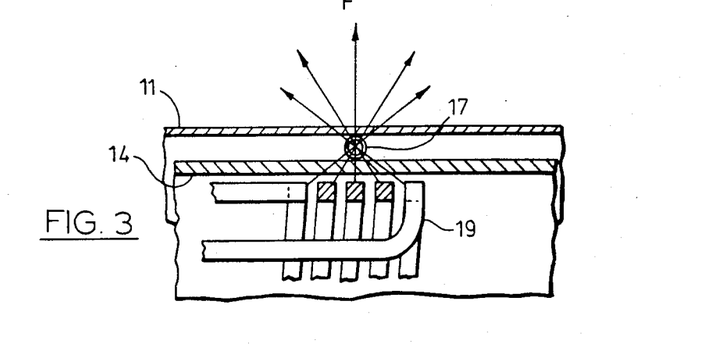
FIGS. 3, 4 and 5 are schematic views, illustrating the principle employed in repositioning an annular spacer.
Figure 4:
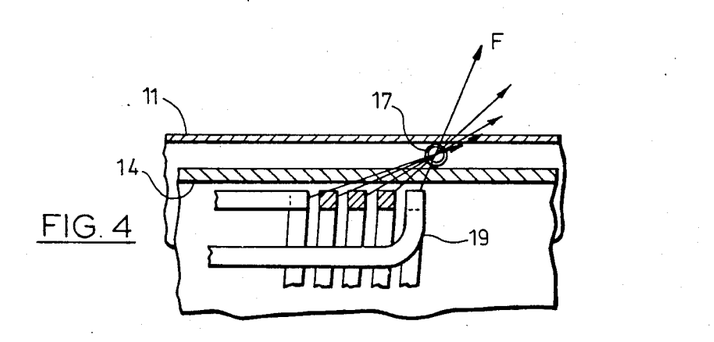
Figure 5:
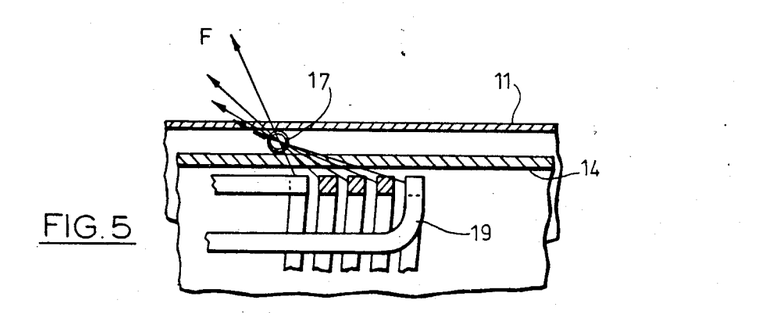

Although the spacers 17 are not accessible by mechanical means after the tubes 11 and 14 are installed, they can be accessed electromagnetically by means of an electromagnetic coil which is advanced inside the coolant tubes. FIGS. 3, 4 and 5 illustrate the principle of this method, in which an electromagnetic coil 19, oriented so as to be coaxial with the coolant tube 14 and calandria tube 11, is advanced to a position adjacent the spacer 17. A current pulse is passed through the coil 19, thereby producing a changing magnetic field and so inducing a back E.M.F. in the annular spacer 17. Since the latter forms a conductive path which is substantially coaxial with the coil 19, the resultant secondary current creates a magnetic field which interacts with the primary field thereby exerting an electromagnetically induced repulsive force on the spacer 17. This force is denoted in FIGS. 3, 4 and 5 by arrows F, each arrow representing a vector component of the force.

The direction and magnitude of the resultant force will depend upon the positions of the individual turns of the coil 19 with respect to the spacer 17. For the purpose of the present invention only the longitudinal component of the force is useful. Thus, in FIG. 3, the turns of the coil 19 are equally distributed on both sides of the annular spacer; the resultant force is radially outward, there being no axial component. In FIG. 4 the resultant repulsive force does have an axial component in one direction, and in FIG. 5 the resultant force has an axial component in the opposite direction. In order to reposition the spacer, therefore, it is necessary to advance the electromagnetic coil 19 to a position adjacent the spacer such that the resultant force will act on the spacer in the direction in which the spacer has to be moved. Furthermore, the force must be such as to overcome the static friction at the seating of the spacer between the tubes.

Apart from the positioning of the electromagnetic coil 19 with respect to the spacer 17, the resultant force will depend upon the rate of change and duration of primary current in the coil 19. In principle this could be an alternating current, but in practice it is necessary to employ a short current pulse which will induce a repulsive electromagnetic force of short duration, so as not to overload the coil 19. The method of the present invention utilizes a current pulse which has the following characteristics:

(a) The frequency of the current waveform is selected to be low enough to penetrate the wall of the coolant tube 14 without suffering a severe decay, yet high enough to induce sufficient current in the annular spacer.

(b) The magnitude is high enough to induce sufficient current in the annular spacer, but not so high as to destroy the current carrying elements or present any risk of deforming or affecting the metallurgical structure of the coolant tube.

In any given case the frequency of the current waveform and the magnitude of the current must lie between upper and lower limits. These limits will depend upon the various electrical and other parameters of the particular system and can be determined analytically or empirically for a given installation.

The current pulse to be applied to the electromagnetic coil 19 may be obtained from any suitable source, for example a homopolar generator, but the applicant has been most successful in obtaining the necessary current pulse from a single discharge of a capacitor bank charged to a suitable energy level. The circuit employed is illustrated diagrammatically in FIG. 6.

Figure 6:
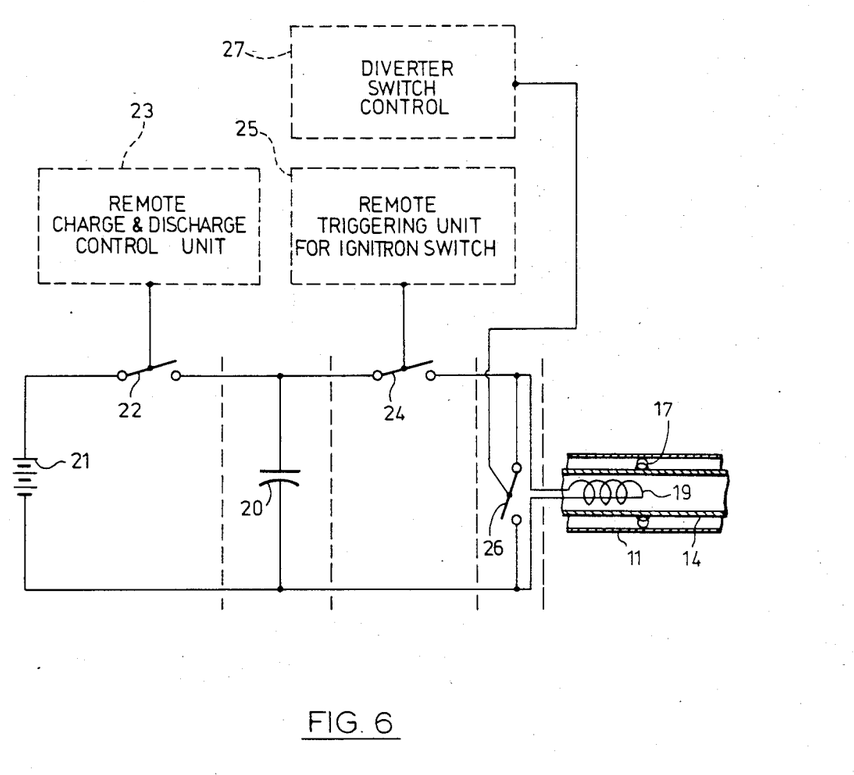
FIG. 6 is a schematic block diagram of the basic circuitry employed in implementing the method of the invention.

Referring to FIG. 6, the capacitor bank 20 is charged from a D.C. source 21, the charging circuit including a switch 22 controlled by a remote control unit 23. Discharge of the capacitor bank 20 through the electromagnetic coil 19 is controlled by an ignitron switch 24 operated from a remote triggering unit 25. The resultant discharge is oscillatory, the frequency of the current waveform being determined by the capacitance of the capacitor bank 20, the inductance of the coil 19, and the inductance of the discharge circuit.

FIG. 6 shows an optional refinement of the circuit, namely a diverter switch 26 connected across the leads to the coil 19 thus providing an alternative current path which bypasses the coil. The switch 26 is also an ignitron, controlled by a control unit 27, the timing of its operation being such as to divert current from the electromagnetic coil after a specified time, that is to say after one or two periods of the oscillatory discharge when a significant part of the energy has been converted to mechanical work. The purpose of this is to improve the life of the coil 19 by not subjecting it to current flow which serves little or no useful purpose.

Figures 7, 8:
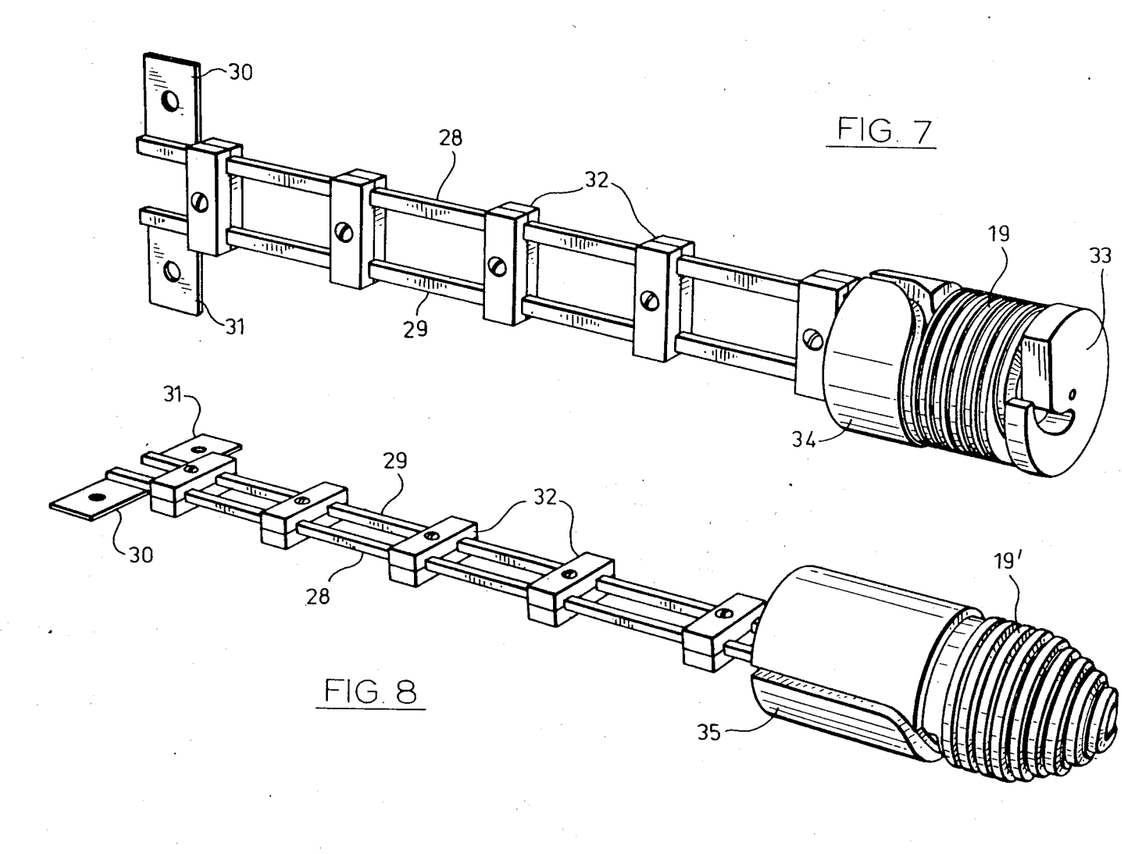
FIGS. 7 and 8 illustrate two types of electromagnetic coil employed in the method of the invention.

Referring now to FIG. 7, which shows one type of electromagnetic coil, the coil 19 consists of a copper rod of rectangular cross section wound on a former of polytetrafluoroethylene forming a rigid helix which is resistant to the axial forces to which the coil will be subjected. The ends of the coil are integral with twin conductors 28, 29 constituted by integral extensions of the copper rod and terminating in electrical terminal straps 30, 31. The conductors 28 and 29 are clamped in parallel spaced relationship by insulating spacers 32. End flanges 33, 34 are formed integrally at the ends of the former, these also being of polytetrafluoroethylene. These end flanges are generally circular and of slightly smaller diameter than the internal diameter of the coolant tube 14, so as to be a sliding fit within the tube, thereby to guide and maintain the coil 19 coaxial with the coolant tube.

The coil construction and configuration shown in FIG. 8 are essentially the same as in FIG. 7, but differ in that the forward end of the coil is tapered. With this arrangement the magnetic field distribution from the coil 19' is modified in such a way as to influence the direction of the repulsive force on the spacer, and so obtain a greater axial displacement than would be possible with a helical coil of the type shown in FIG. 7. A limiting case of such a coil arrangement would be a pancake coil. However, the positioning of a pancake coil with respect to the spacer to be moved would be critical. Another difference from the first coil is that instead of end flanges for guiding the coil coaxially along the fuel channel, the rear end of the polytetrafluoroethylene former is stepped to provide a cylindrical portion 35 of such a diameter as to slide along the fuel channel and guide the coil 19' coaxially therein.

It will be noted that the cylindrical portion 35, as also the end flange 34 of FIG. 7, is slotted to allow passage of the conductor 28 which is the terminal lead of the rear end turn of the coil. The other conductor 29, forming the terminal lead of the forward end turn, extends centrally through the coil to its forward end turn.

Figure 9:
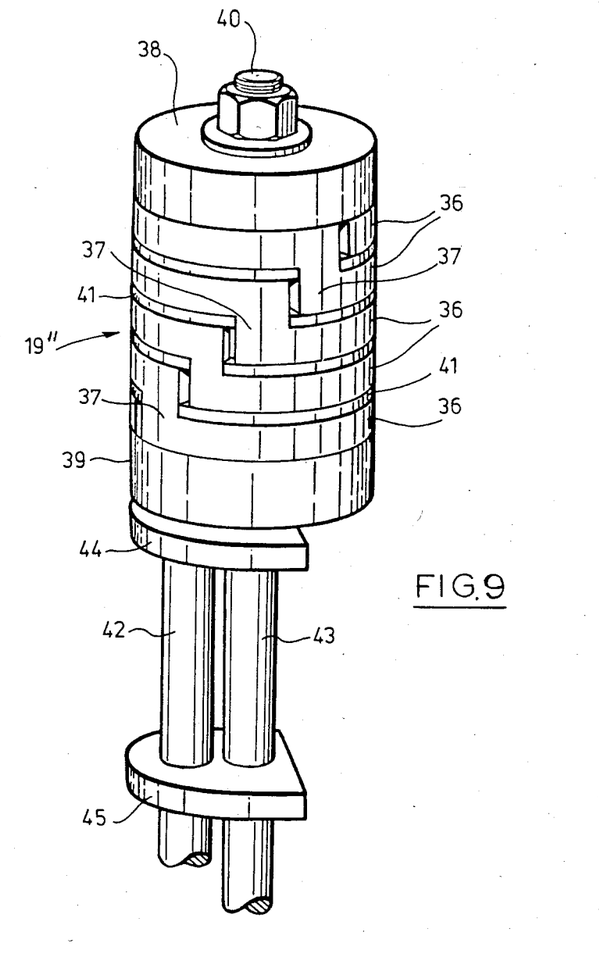
FIG. 9 illustrates another type of coil employed in the method of the invention.

Yet another type of electromagnetic coil is illustrated in FIG. 9. In this case the coil 19'', which is essentially a helical coil, is machined from a copper cylinder, incomplete annular slots being machined in the cylinder to define the successive turns 36 of the coil, and adjacent turns being interconnected by connector portions 37 formed by the unmachined parts of the copper cylinder. As will be seen in FIG. 9, the ends of the incomplete annular slots are staggered relative to one another so that the connector portions 37 are also staggered.

The coil so formed is clamped between cylindrical members 38, 39 of insulating material such as glass fibre reinforced laminate of the type sold under the trade mark "Melamine", these being of such a diameter as to guide the coil coaxially along a fuel channel. The members 38 and 39 are interconnected by a reinforcing rod 40 on which they are mounted and clamped towards one another so as to form a rigid assembly. In order to impart even greater rigidity to the assembly, split annular spacers 41 are inserted into the slots between the turns 36 prior to clamping, these spacers 41 serving as additional supports to support the turns of the coil axially and to improve the electrical insulation between the turns. Twin conductors 42, 43 formed as solid rods separated by insulating spacers 44, 45 provide the leads to the end turns of the coil, the reinforcing rod 40 being an extension of the conductor 43.

Each of the coil assemblies shown in FIGS. 7, 8 and 9 is encapsulated. When assembled, the assembly in each case is impregnated in a suitable liquid resin and baked so that the resin becomes rigid.

The leads to the coil need not be twin conductors, but may be coaxial conductors.

Figure 10:
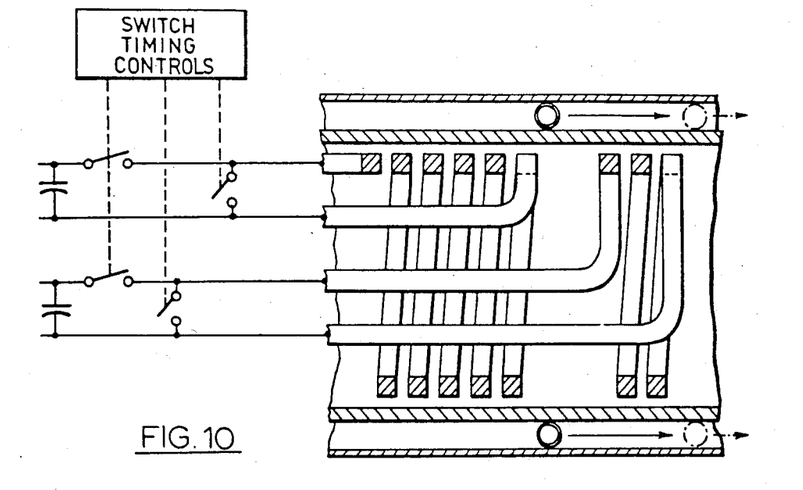
FIG. 10 is a schematic view illustrating a modification of the method of the invention.

FIG. 10 illustrates a modified system. As in the system of FIG. 6, the electromagnetic coil 19 is advanced interiorly along the coolant tube 14 to a position adjacent the selected annular spacer 17. A current pulse is passed through the coil, the current pulse being obtained by discharge of a capacitor bank 20. The discharge is initiated by an ignitron switch 24. The position of the coil 19 in relation to the spacer 17, and the magnitude and rate of change of current in the coil, are chosen to be such that the electromagnetic repulsive force exerted on the spacer will be in the required direction and sufficient to overcome static friction at the seating of the spacer. However, once the annular spacer has commenced to move, the repulsive force exerted on it becomes less, and so it is advantageous to apply a second impulse to the spacer after time delay as the spacer moves across a second position ahead of its initial position. This can be achieved by providing a second electromagnetic coil 46 which is mounted coaxially with the first coil 19, so that the two coils are advanced interiorly along the coolant tube 14 in fixed axial spaced relationship to one another up to the required position adjacent the spacer to be displaced. A second current pulse is passed through the second coil in timed relation to the first current pulse through the first coil, thereby to impart an accelerating impulse to the spacer as it moves past the second coil. The second current pulse is obtained by discharge of a second capacitor bank 47, the discharge being initiated by an ignitron switch 48 in the discharge circuit. The timing of the ignitron switches 24 and 48 is controlled by a remote timing unit 49. The timing unit 49 also controls ignitron diverter switches 50, 51 connected across the input leads to the coils. These diverter switches function in the manner of the switch 26 (FIG. 6) and serve exactly the same purpose, namely to divert current from the respective coils after the current has effected a significant part of the useful work.

Figure 11:
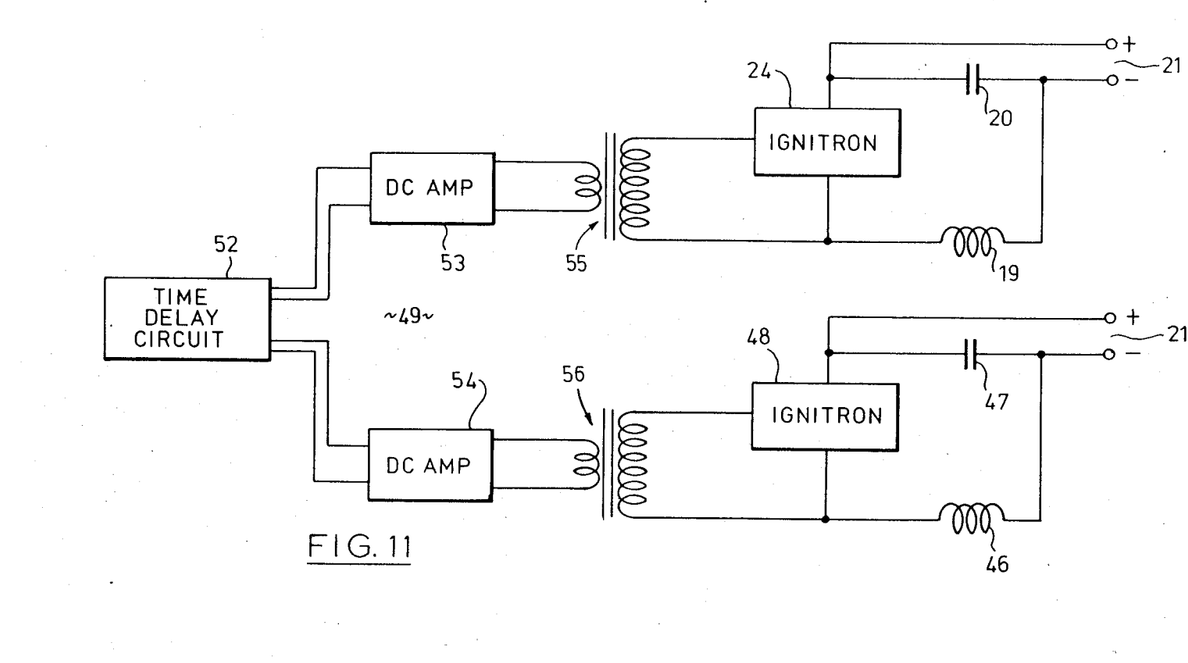
FIG. 11 is a schematic block diagram of the electrical circuitry employed in the modified method of FIG. 10.

A general electrical diagram of this system is shown in FIG. 11 in which components previously discussed are denoted by the same reference numerals, the diverter switches 50 and 51 being omitted for simplicity. The triggering pulses for the ignitrons 24, 48, and also for the diverter switches if these are incorporated in the system, are derived from a triggering unit including a time delay circuit 52 via D.C. amplifiers 53, 54 coupled to the ignitrons by pulse transformers 55, 56.

Figure 12:
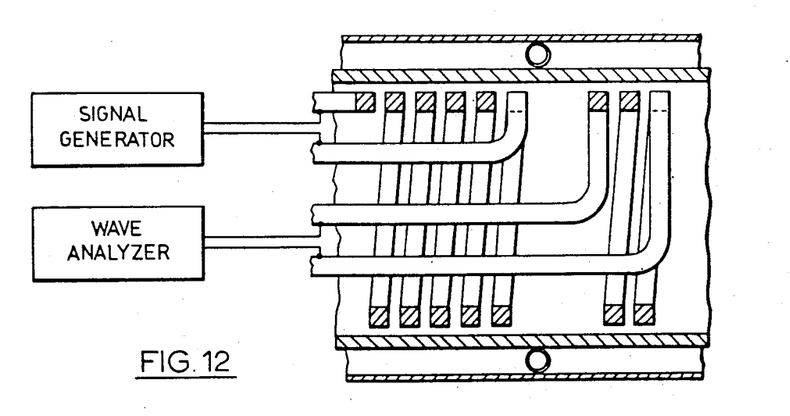
FIG. 12 is a schematic block diagram of the electrical circuitry employed in a method of detecting the position of a spacer.

Referring now to FIG. 12, in order to determine the position of an annular spacer 17, both prior to and after its being repositioned, it is necessary to access the spacer electromagnetically from within the fuel channel. This is accomplished by advancing an electromagnetic coil 57 interiorly along the selected coolant tube 14 while advancing a second electromagnetic coil 58 along the tube in fixed axial relation to it, the two coils being guided so as to remain coaxial with the tube and with one another. The two coils may be constructed in the same way as the coils 19 and 46 previously described, and may be the same coils, although in this case their construction and design are not critical since the coils will not be subjected to high currents and large electromagnetic forces. In practice it is usually most convenient to employ the coils 19, 46 for the purpose rather than to use a separate coil assembly. An alternating current is supplied to the electromagnetic coil 57 from a signal generator 59, and the secondary current induced in the coil 58 is detected by a waveform analyzer 60. The waveform of this secondary current is modified by interaction with eddy currents induced in the coolant tube 14 and calandria tube 11, and is further modified when this probe unit reaches the position of an annular spacer by interaction with eddy currents induced in the latter. Thus, the position of an annular spacer can be determined by noting a change in the secondary waveform and noting the position of the probe unit at which the change occurs. In this way one can readily determine which of the annular spacers, if any, have to be repositioned.

In the method so far described it is envisaged that the electromagnetic coil or coils shall be maintained in coaxial relationship with the coolant tube, and the coils 19 and 46 of the preceding figures are mounted on their respective formers in such a way as to ensure that this coaxial relationship is maintained. In this way one can maximize the axial repulsive force which is applied to the annular spacer, it being assumed that the spacer is also coaxial with the coolant tube. However, in some cases, particularly after the installation of the calandria and prior to charging of the fuel channels, a spacer may be slightly tilted from the vertical and it may be desirable to apply to it an electromagnetic repulsive force which will effect a turning moment on the spacer so as to turn it from one tilted position to the other. For this purpose one may employ a coil which is mounted on its former in such a way that its axis remains parallel to the tube axis but displaced from it. Such a coil is illustrated in FIG. 13.

Figure 13:
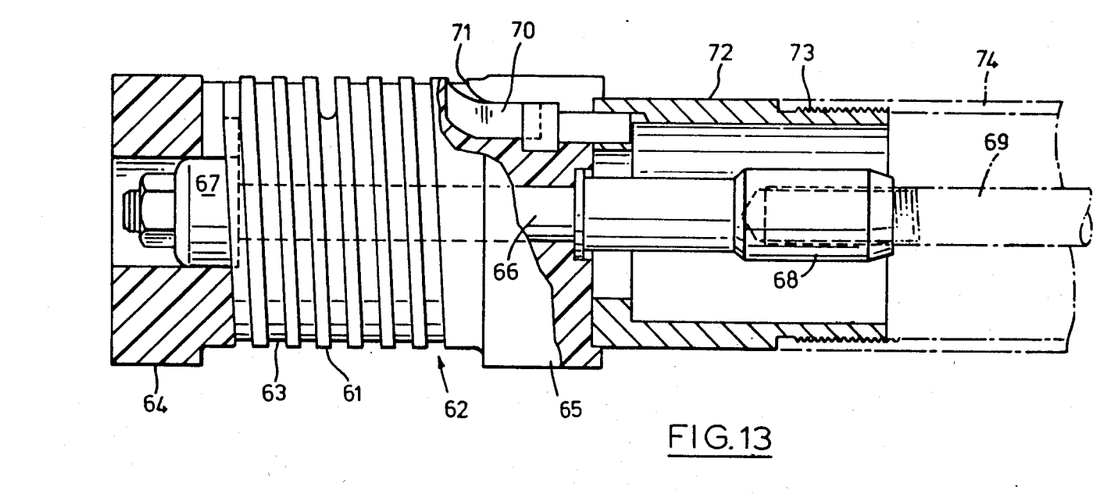
FIG. 13 is a part-sectional view of yet another type of coil employed in the method of the invention.

Referring to FIG. 13, the coil 61 consists of a heavy copper conductor wound helically on a former 62 of rigid insulating material, in the present example polyethylene. The former 62 is machined from a cylinder of the insulating material so as to provide a coil carrying cylindrical portion 63 with end flanges 64, 65. The cylindrical portion 63 is not coaxial with the end flanges 64, 65, its axis being parallel to but displaced from the common axis of the flanges.

The former 62 has an axial bore through which a reinforcing rod 66 extends coaxially with the helical coil 61 carried by the cylindrical porton 63. At the leading end of the rod 66 is a connector 67, to which the leading end turn of the coil 61 is silver soldered. The other end of the rod is formed with an internally threaded coupling cup 68, into which the inner conductor 69 of a coaxial conductor assembly is threaded.

The rear end turn of the coil 61 has an extension 70 which is taken through a slot 71 in the end flange 65 and silver soldered to a copper sleeve 72. The copper sleeve 72 has an externally threaded end portion 73 onto which the outer conductor 74 of the coaxial conductor assembly is threaded.

The annular end flanges 64, 65 are of such a diameter as to be an easy sliding fit in the coolant tubes of the reactor, thereby supporting the coil 61 so that its axis remains parallel to, but is displaced from the axis of the coolant tube. By using this coil arrangement rather than the coil arrangement of FIG. 7, say, one can apply to the annular spacer an electromagnetic repulsive force which will be exerted more strongly on the upper portion of the spacer than on the lower portion and so flip the spacer from one tilted position to the other.

The method of the invention has been subjected to a programme of tests, preparatory to applying the method in the field, in order to determine suitable parameters of the electrical system. For the purpose of the tests, an apparatus was constructed to simulate the geometry of the calandria system of a Candu reactor and to simulate the conditions to which the garter springs would be subjected in the calandria system. The displacements of the garter springs under various conditions were measured, and the results of the tests are set out in Tables 1 to 5 below.

The first capacitor bank used in this programme was a 60 kJ bank. It consisted of twenty capacitor units connected in parallel, and was discharged via a single ignitron rated for 600 kA maximum current. The complete capacitor bank and load coil system had the following characteristics:

| | |
|---|---|
| Total capacitance = | 1200 $\mu$F |
| Maximum charging voltage = | 10 kV |
| Bank inductance (including bank connection, ignitron switch and connecting leads) | 3.0 $\mu$H |
| Coil inductance (typical coil) | 2.5 $\mu$H |
| Total system inductance | 5.5 $\mu$H |
| Ringing frequency (using a typical coil) | 2000 Hz |

Using this bank and a typical coil having 5–6 turns with wide spacing between turns (6.3 mm), the following movements of a garter spring placed on a pressure tube were recorded as a function of coil current (coil current is adjusted by charging the capacitor bank to various voltage levels):

TABLE 1

Garter Spring Displacement as a Function of Current

| Charging Voltage | Coil current (Calculated) | Maximum Displacement |
|---|---|---|
| 1 kV | 10 kA | None |
| 2 kV | 21 kA | Slight movement but no displacement |
| 3 kV | 31 kA | 1 mm |
| 4 kV | 41 kA | 2 mm |
| 6 kV | 62 kA | 4 mm |
| 7 kV | 72 kA | 5 mm |
| 8 kV | 82 kA | 10 mm |
| 10 kV | 103 kA | 26 mm |

It should be noted that coils having smaller spacing between the turns give better results than those listed in Table 1 above, since they concentrate the electromagnetic field more densely in a given coil length.

The second capacitor bank used in the experimental programme has similar characteristics to those of the first bank, but was larger. Its capacitance was 1818 $\mu$F (91 kJ, when charged to 10 kV); the total system inductance was maintained at approximately 5.5 $\mu$H to obtain a ringing frequency of 1600 Hz with these system parameters and a coil having 4 mm spacings between its turns, the displacements achieved are set out in Table 2.

TABLE 2

| Charging Voltage | Coil Current (Calculated) | Maximum Displacement |
|---|---|---|
| 1 kV | 12.7 kA | None |
| 2 kV | 25.4 kA | 1 mm |
| 3 kV | 38.1 kA | 2 mm |
| 4 kV | 50.8 kA | 3 mm |
| 5 kV | 63.5 kA | 11 mm |
| 6 kV | 76.2 kA | 25 mm |
| 7 kV | 88.9 kA | 55 mm |
| 8 kV | 101.6 kA | 91 mm |

The two banks described above were connected together (in parallel) to provide a total capacitance of 150 kJ (3000 $\mu$F). The ringing frequency was maintained at approximately 1300 Hz. Using a driving coil with 4 mm spacings between its turns, the following dissplacements, set out in Table 3, were recorded:

TABLE 3

| Charging Voltage | Coil Current (Calculated) | Maximum Displacement |
|---|---|---|
| 1 kV | 17 kA | 1 mm |
| 2 kV | 34 kA | 2 mm |
| 3 kV | 51 kA | 5 mm |
| 4 kV | 68 kA | 10 mm |
| 5 kV | 85 kA | 25 mm |
| 6 kV | 102 kA | 56 mm |
| 7 kV | 119 kA | 135 mm |

The maximum motion of the garter spring achieved with both the calandria tube and pressure tube present was 115 mm. It is important to note that the coils used were failing mechanically at current levels exceeding 120 kA or at repeated discharges exceeding 80 kA.

A 200 kJ capacitor bank of 4080 μF capacitance was used next. This system differed from the previous one in its arrangement and connection. The bank was subdivided into six modules each having four capacitors and an ignitron rated for 100 kA. Six coaxial cables were used to connect the capacitor bank to the coil via an interface block. This neat arrangement reduced the inductance of the capacitor bank and coaxial cables to about 0.1 μH. Using a five-turn coil with about 2.0 μH inductance the ringing frequency of the system was about 1780 Hz. Under these conditions the following results, set out in Table 4, were recorded.

TABLE 4

| Charging Voltage | Coil Current (Calculated) | Maximum Displacement |
|---|---|---|
| 1 kV | 36 kA | None |
| 2 kV | 72 kA | 2 mm |
| 3 kV | 108 kA | 10 mm |
| 4 kV | 144 kA | 20 mm |
| 5 kV | 180 kA | 47 mm |

The results in Table 4 confirm that the garter spring displacement increases as the frequency decreases, provided that the same current level can be maintained. Normally, to decrease the frequency extra inductance can be inserted in the system, which reduces the current that can be drawn from a fixed size capacitor bank. To compensate for the reduction in current, extra capacitance has to be added which means a larger capacitor bank. To demonstrate this point a "dummy" inductance was added into the system and a new five-turn coil was used. The ringing frequency of the system was reduced to about 1250 Hz and the following results, set out in Table 5, were recorded:

TABLE 5

| Charging Voltage | Coil Current (Calculated) | Maximum Displacement |
|---|---|---|
| 1 kV | 31 kA | None |
| 2 kV | 56 kA | Slight movement but no displacement |
| 3 kV | 82 kA | 3 mm |
| 3.5 kV | 100 kA | 10 mm |
| 4.0 kV | 106 kA | 20 mm |
| 4.5 kV | 112 kA | 23 mm |
| 5.0 kV | 137 kA | 41 mm |
| 5.5 kV | 143 kA | 58 mm |

If the results in Table 4 and Table 5 are compared, one can see that equivalent displacements are achieved at much lower current. Further improvement can be achieved by increasing the inductance of the driving coil itself (by increasing the number of turns in the coil). This is illustrated by Table 6 below for an eight-turn coil at a frequency of 1190 Hz.

TABLE 6

| Charging Voltage | Coil Current (Calculated) | Maximum Displacement |
|---|---|---|
| 1 kV | 25 kA | None |
| 2 kV | 53 kA | 0.5 mm |
| 2.5 kV | 63 kA | 1.0 mm |
| 3.0 kV | 75 kA | 1.0 mm |
| 3.5 kV | 87 kA | 5.0 mm |
| 4.0 kV | 93 kA | 13.0 mm |
| 4.5 kV | 100 kA | 22.0 mm |
| 5.0 kV | 112 kA | 30.0 mm |
| 5.5 kV | 118 kA | 45.0 mm |
| 6.0 kV | 124 kA | 81.0 mm |

All of the above results show the importance of optimizing the system parameters and coil design.

In practice, when applying the method in the field, it is not sufficient merely to measure the the displacement of a garter spring from its initial position. It is necessary to ensure that the garter spring is displaced to the required position, which may be a considerable distance from the initial position. In many instances, therefore, it is necessary to move the garter spring from its initial position to the required position step by step by a succession of such displacements each accomplished in the manner previously described.

The method described above is especially applicable to the repositioning of garter springs, i.e. annular spacers employed in the calandria structure of a fluid-cooled nuclear reactor, where the garter springs would not otherwise be accessible. The apparatus employed is especially suitable for mounting on a carriage with automatic positioning means for the coil or coils, the carriage and the electrical equipment mounted thereon being controlled from a remote station, or incorporating a programmed controller to determine and supervise its operations.

What I claim is:

1. In a fluid-cooled nuclear reactor having a calandria comprising an array of longitudinally extending calandria tubes each housing a coolant tube extending coaxially therethrough, each coolant tube being spaced from its associated calandria tube by annular spacers seated therebetween, a method of repositioning a selected one of said spacers in situ by displacing it longitudinally from an initial position to a required position, which method comprises advancing an electromagnetic coil interiorly along the coolant tube to a position adjacent the spacer and passing a varying electric current through the coil, the position of the coil relative to the spacer and the magnitude and rate of change of current being such as to exert an electromagnetic repulsive force on the spacer in the direction of the required displacement and sufficient to overcome static friction at the seating of the spacer between the tubes.

2. A method according to claim 1, wherein the annular spacers, the coolant tubes and the calandria tubes, are of nonferromagnetic metal.

3. A method according to claim 2, wherein a second electromagnetic coil is advanced interiorly along the coolant tube in fixed axial relationship to the first coil, the second coil being axially spaced from the first coil in the direction of the required displacement, and wherein a second varying electric current is passed through the second coil in time relation to the first-mentioned current thereby to impart an accelerating impulse to the spacer during its displacement.

4. A method according to claim 2, further comprising the step of diverting current from the coil at a predetermined time after the initiation of the applied varying current.

5. A method according to claim 2, 3 or 4, wherein the spacer is displaced step by step from the initial position to the required position by successive such displacements.

6. A method according to claim 2, wherein the varying electric current is a current pulse derived from a capacitor external to the calandria and connected in circuit with the coil, the method comprising charging the capacitor to a predetermined voltage, advancing the coil to said position adjacent the spacer, and discharging the capacitor through the coil.

7. A method according to claim 2, wherein the varying electric current is derived from a homopolar generator connected in circuit with the coil.

8. A method according to claim 2, wherein the calandria tubes, the coolant tubes, and the annular spacers, are of zirconium/niobium alloy.

9. A method according to claim 2, wherein the annular spacers are garter springs.

10. In a fluid-cooled nuclear reactor having a calandria comprising an array of longitudinally extending tubes each housing a coolant tube extending coaxially therethrough, each coolant tube being spaced from its respective calandria tube by annular spacers, the spacers and the calandria tubes and coolant tubes all being of nonferromagnetic metal, a method of determining the positions of the spacers of a selected coolant tube which comprises advancing a first electromagnetic coil interiorly along the coolant tube while advancing a second electromagnetic coil interiorly along the coolant tube in fixed axial relation to the first coil, passing an alternating current through the first coil while examining the waveform of current induced in the second coil, and detecting changes in said waveform.

11. A method of repositioning a nonferromagnetic metallic member which is constrained to move longitudinally with respect to a tube, the tube having a wall of nonferromagnetic material and the member being located on one side of the wall at which it is not directly accessible, which method comprises advancing an electromagnetic coil along the tube on the other side of the wall to a position adjacent said member and, while maintaining the coil coaxial with the tube, passing a current pulse through the coil, the position of the coil relative to the member and the magnitude and rate of change of current being such as to exert an electromagnetic force on said member in the direction of the required displacement and sufficient to overcome any static friction to which the member is subjected.

12. A method according to claim 2 in which the electromagnetic coil is a helical copper coil mounted on a rigid former having end flanges supporting the former in the coolant tube, adjacent turns of the coil being spaced from one another and separated by spacer inserts supporting the turns axially.

13. A method according to claim 12, wherein the end flanges are coaxial with the former on which the coil is mounted.

14. A method according to claim 12, wherein the end flanges are eccentric with respect to the former thereby supporting the coil so that its axis is parallel to but displaced from the tube axis.

* * * * *